(12) United States Patent
Tanaka et al.

(10) Patent No.: US 8,171,922 B2
(45) Date of Patent: May 8, 2012

(54) BLOW-BY GAS RECIRCULATION SYSTEM FOR INTERNAL COMBUSTION ENGINE

(75) Inventors: Fusatoshi Tanaka, Higashihiroshima (JP); Katsunori Kuremiya, Hiroshima (JP); Kenichi Kawaguchi, Hachioji (JP)

(73) Assignee: Mazda Motor Corporation (JP)

( * ) Notice: Subject to any disclaimer, the term of this patent is extended or adjusted under 35 U.S.C. 154(b) by 554 days.

(21) Appl. No.: 12/395,899

(22) Filed: Mar. 2, 2009

(65) Prior Publication Data

US 2009/0223497 A1 Sep. 10, 2009

(30) Foreign Application Priority Data

Mar. 5, 2008 (JP) .................................. 2008-054644

(51) Int. Cl.
*F01M 13/00* (2006.01)
(52) U.S. Cl. ......................................................... 123/572
(58) Field of Classification Search .......... 123/572–574, 123/41.86, 195 C
See application file for complete search history.

(56) References Cited

U.S. PATENT DOCUMENTS

| | | | | |
|---|---|---|---|---|
| 5,474,035 A * | 12/1995 | Ming et al. | ................ | 123/41.86 |
| 6,604,506 B2 | 8/2003 | Tanaka et al. | | |
| 2004/0159313 A1* | 8/2004 | Obayashi et al. | ............. | 123/572 |
| 2004/0159314 A1* | 8/2004 | Ishizuka et al. | ............... | 123/572 |

FOREIGN PATENT DOCUMENTS

| | | |
|---|---|---|
| JP | 2000-008827 | 1/2000 |
| JP | 2002-106429 | 4/2002 |

\* cited by examiner

*Primary Examiner* — M. McMahon
(74) *Attorney, Agent, or Firm* — Studebaker & Brackett PC; Donald R. Studebaker

(57) ABSTRACT

The invention relates to a blow-by gas recirculation system for an internal combustion engine. An oil separation cover 10 has a surge-tank mounting portion 400 integrally formed therewith in a columnar shape having a cam-shaped cross-section and a height approximately equal to that of an oil separation space OS. The surge-tank mounting portion 400 has a flat upper surface serving as a mounting seat surface 401 capable of coming into surface contact with an attaching seat surface 7*a* of a surge tank 7. A first opening 403 of a gas passage from a chamber 300 is opened in a vicinity of an opening of a support through-hole 402 on the mounting seat surface 401. Through an operation of joining the seat surface 7*a* of the surge tank 7 to the mounting seat surface 401 of the surge-tank mounting portion 400 while communicating the first opening 403 with a second opening 7*b* opened on the attaching seat surface 7*a* of the surge tank 7, a third gas passage 15 for supplying blow-by gas to an inside of the surge tank 7 is formed in such a manner as to penetrate through the oil separation cover 10 and the surge tank 7.

12 Claims, 8 Drawing Sheets

BLOW-BY GAS RECIRCULATION SYSTEM FOR INTERNAL COMBUSTION ENGINE

BACKGROUND OF THE INVENTION

1. Field of the Invention

The present invention relates to a blow-by gas recirculation system for an internal combustion engine, and more particularly to a blow-by gas recirculation system which comprises an intake unit provided with a throttle valve and an intake passage and disposed on the side of one of opposite sidewalls of an engine body, an oil separation cover defining an oil separation space in cooperation with the one sidewall, and a positive crankcase ventilation (PCV) valve attached to the oil separation cover, wherein the system is designed to separate oil from blow-by gas introduced from an inside of the engine body into the oil separation space and supply the blow-by gas to a region of the intake passage downstream of the throttle valve.

2. Description of the Related Art

During a course of combustion in an internal combustion engine (hereinafter referred to simply as "engine"), unburned gas leaked from combustion chambers into a crank chamber defined inside a cylinder block and an oil pan, so-called "blow-by gas", is generated. It is a common practice to collect such blow-by gas and recirculate the blow-by gas to an intake system to re-subject it to a combustion process. The collected blow-by gas contains lubricating oil in the form of a mist. Thus, if it is insufficient to separate the oil component from the collected blow-by gas, the residual oil is likely to cause adverse effects on a catalyst in an exhaust system.

For this reason, a blow-by gas recirculation system has been commonly employed which is adapted to introduce blow-by gas into an intake system after separating oil from the blow-by gas, in such a manner that an oil separator chamber is provided in an engine body to separate oil from blow-by gas, and a positive crankcase ventilation valve (hereinafter referred to as "PCV valve") is connected to the oil separator chamber and further connected to the intake system via a positive crankcase ventilation hose (hereinafter referred to as "PCV hose"). In this blow-by gas recirculation system, moisture contained in the blow-by gas is likely to freeze due to cooling of the PCV valve and the PCV hose by wind created under driving conditions at extremely low-temperatures, and thereby adversely affect a blow-by gas recirculation capability.

Moreover, as recent trends, an intake manifold and an oil separator chamber-defining member have been increasingly made of a synthetic resin material to facilitate a reduction in cost and weight and a compact layout. In this case, heat conduction from an engine body is reduced as compared with the case where they are made of a metal material, and thereby the freeze phenomenon will become more prominent.

As measures against this problem, for example, there has been known a structure disclosed in JP 2002-106429A (hereinafter referred to as "Patent Document 1"). Specifically, in the structure disclosed in the Patent Document 1, an engine is arranged in a direction transverse to a frontward-rearward (i.e., longitudinal) direction of a vehicle while allowing a resin intake manifold to be oriented toward a front end of the vehicle, and a concave portion formed in one of opposite sidewalls of the engine is covered by a resin cover to define an oil separator chamber therebetween, wherein a PCV valve and a PCV hose are arranged to fall within a projected area of the intake manifold when viewed rearwardly from the front end of the vehicle.

In the structure disclosed in the Patent Document 1, the PCV valve and the PCV hose are arranged to fall within the projected region of the intake manifold located frontward of the PCV valve and the PCV hose in the longitudinal direction of the vehicle. This makes it possible to prevent deterioration in blow-by gas recirculation capability due to wind created under driving conditions, even employing the resin intake manifold and the resin oil separator chamber-defining cover.

Although the above system has such advantage, there is still a need for preparing a PCV hose for recirculating blow-by gas to an intake manifold, and reliably reducing a rate of defective assembling of a PCV hose during a production process to guarantee a desired recirculation capability of the PCV hose.

Recent years, in addition to the trend toward synthetic resin intake manifolds, an electronically controlled throttle body has been increasingly employed in view of improvement in engine operability/controllability. This electronically controlled throttle body is equipped with a motor for driving a throttle valve and other components, and therefore a weight thereof including a housing becomes fairly large. Thus, in order to fixedly support the electronically controlled throttle body to an intake system, it is necessary to improve a connection structure to the intake manifold and additionally provide a member, such as a stay, for improvement in supporting strength of an intake manifold itself relative to an engine body. Therefore, an available space around the engine, particularly the intake system, is extremely restricted to make it harder to ensure a layout and an assembling operation of a PCV hose.

JP 2000-008827A (hereinafter referred to as "Patent Document 2") discloses a PCV passage structure wherein an upstream end of an intake manifold is arranged adjacent to a cylinder head. In the Patent Document 2, a stiffner (cover member) is additionally attached to a head cover covering an upper portion of the cylinder head, and a PCV valve is installed inside a pipe-shaped portion of the stiffner (an extension portion of the stiffner on an opposite side of its attaching flange to the cylinder head and the head cover). Then, the stiffner is connected to the intake manifold at a distal end of the pipe-shaped portion to introduce blow-by gas in a breather chamber into the intake manifold via the pipe-shaped portion.

However, considering the structure disclosed in the Patent Document 2 in terms of stability in mounting strength of an intake manifold to an engine body, a need for further improvement still remains.

SUMMARY OF THE INVENTION

In view of the structures disclosed in the Patent Documents 1 and 2, it is a first object of the present invention to enable the improvement in mounting strength of an intake system, the elimination of a PCV hose, and the prevention of deterioration in blow-by gas recirculation capability due to defective assembling of a PCV hose. It is a second object of the present invention to stabilize the attachment of an oil separation cover.

In order to achieve the above objects, according to one aspect of the present invention, there is provided a blow-by gas recirculation system for an internal combustion engine to separate oil from blow-by gas introduced from an inside of an engine body into an oil separation space and then supply the blow-by gas to a region of an intake passage downstream of a throttle valve in an intake system. The blow-by gas recirculation system comprises an intake unit provided with the throttle valve and the intake passage and disposed on the side of one of opposite sidewalls of the engine body, an oil separation cover attached to the one sidewall of the engine body to define the oil separation space in cooperation with the one sidewall, and a gas passage which provides communication between the oil separation space and the region of the intake passage downstream of the throttle valve of the intake unit, wherein the gas passage is formed inside the oil separation cover and the intake unit. The oil separation cover has a rim wall formed as an attaching flange, wherein the oil separation cover is fastened to the engine body at a plurality of positions through the attaching flange, and the attaching flange is formed to have a mounting seat surface for the intake unit. The intake unit has a contact surface formed on a gas passage-adjacent portion thereof located adjacent to a region of the gas passage formed thereinside, wherein the intake unit is fastened to the oil separation cover under a condition that the contact surface is in contact with the mounting seat surface of the oil separation cover. The gas passage is formed to penetrate through the contact surface.

These and other objects, features and advantages of the present invention will become apparent upon reading of the following detailed description along with the accompanied drawings.

DESCRIPTION OF THE PREFERRED EMBODIMENTS

Figure 1:
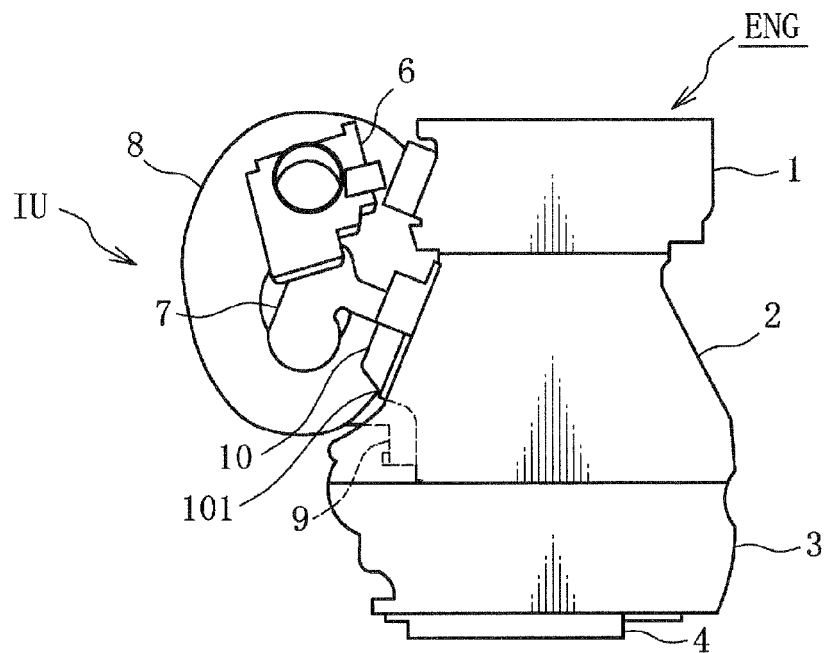
FIG. 1 is a side view showing an engine employing a blow-by gas recirculation system according one embodiment of the present invention.

With reference to FIG. 1, a structure of an engine employing a blow-by gas recirculation system according one embodiment of the present invention will firstly be roughly described. An engine body ENG comprises a cylinder head 1, and a cylinder block which includes an upper block 2, a lower block 3 and an oil pan 4. More specifically, this engine body ENG is a multi-cylinder engine, specifically a so-called "transverse-mounted 4-cylinder engine" where four cylinders are laid out in an engine compartment of a vehicle in such a manner that they are arranged in a widthwise (i.e., lateral) direction of the vehicle (in a direction transverse to a frontward-rearward (i.e., longitudinal) direction of the vehicle).

The upper block 2 and the lower block 3 is fixedly fastened together while allowing a crankshaft (not shown) is rotatably supported by them, and mounted on the oil pan 4. As measures for preventing vibration of the engine body ENG, a lattice (or ladder) structure is employed which is designed to form a bulk head 5 in the upper block 2 in the form of a lateral wall crossing between adjacent ones of the cylinders, and correspondingly form a crankshaft bearing in the lower block 3, while connecting respective front and rear matching surfaces of corresponding ones of the bulk head 5 and the crankshaft bearing together.

An intake unit IU for supplying air to each of four combustion chambers of the engine body ENG comprises a throttle body 6, and an intake passage which includes a surge tank 7 and an intake manifold (four branched intake passages) 8.

Air sucked from an air cleaner is introduced into an intake duct (not shown) upstream of the throttle body 6, and then supplied to the surge tank 7. The throttle body 6 is a so-called "electronically controlled throttle body" which comprises a metal housing formed to surround an outer periphery thereof, a throttle valve, and a built-in motor adapted to control the throttle valve according to a control signal indicative of a control amount of the throttle valve calculated by a control unit based on a depression amount of an accelerator pedal. The air supplied to the surge tank is supplied to each of the combustion chambers via the intake manifold 8 connected to the cylinder head 1. The intake manifold 8 is made of a synthetic resin material, such as a polyamide resin, and formed in a shape curved upwardly from a lower portion of a front one of opposite sidewalls of the engine body ENG in the longitudinal direction of the vehicle. The intake unit IU is supported relative to the engine body ENG by connecting it to the cylinder head 1 in the aforementioned manner, fastening it to the upper block 2 using a stay 9, and attaching it to an oil separation cover 10 for defining an oil separation space in cooperation with the front sidewall of the upper block 2, as will be described later.

With reference to FIGS. 2 to 6, the blow-by gas recirculation system according to this embodiment will be described below.

Figure 2:
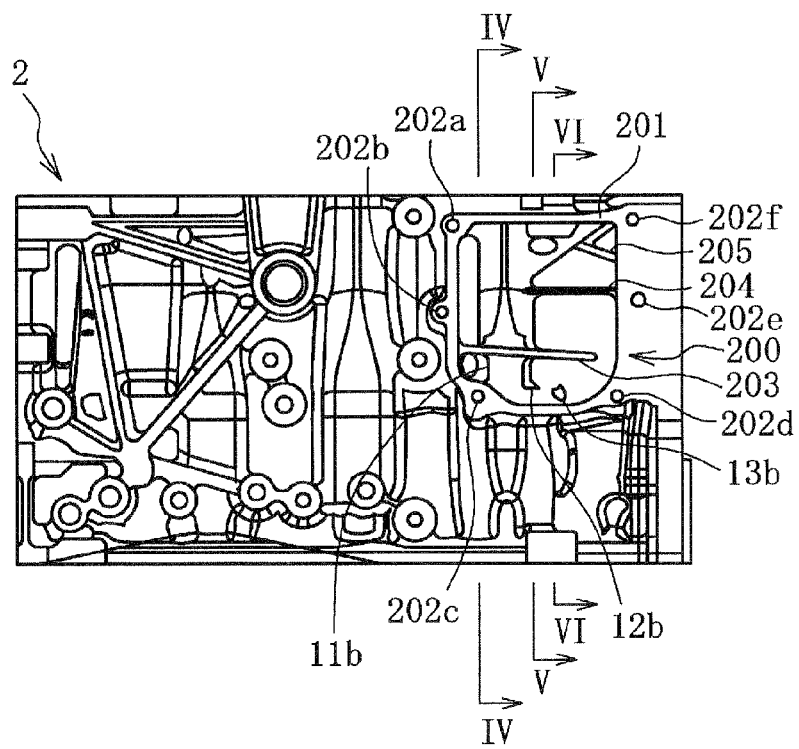
FIG. 2 is a side view showing an upper block of an engine body, when viewed from the side of an intake unit of the engine.
Figure 3:
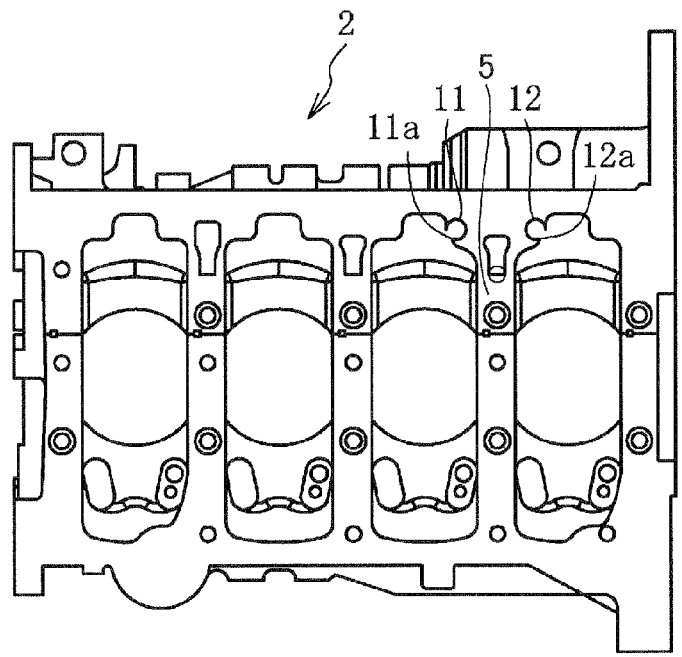
FIG. 3 is a bottom view showing the upper block.
Figure 4:
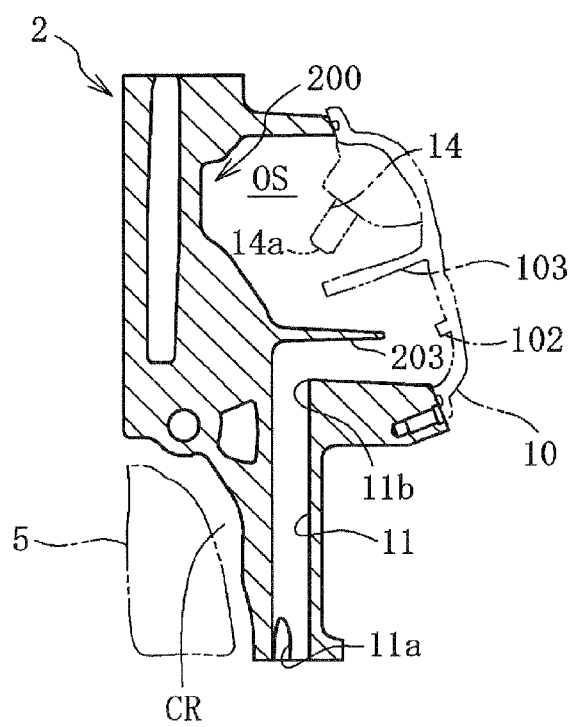
FIG. 4 is a sectional view taken along the line IV-IV in FIG. 2.
Figure 5:
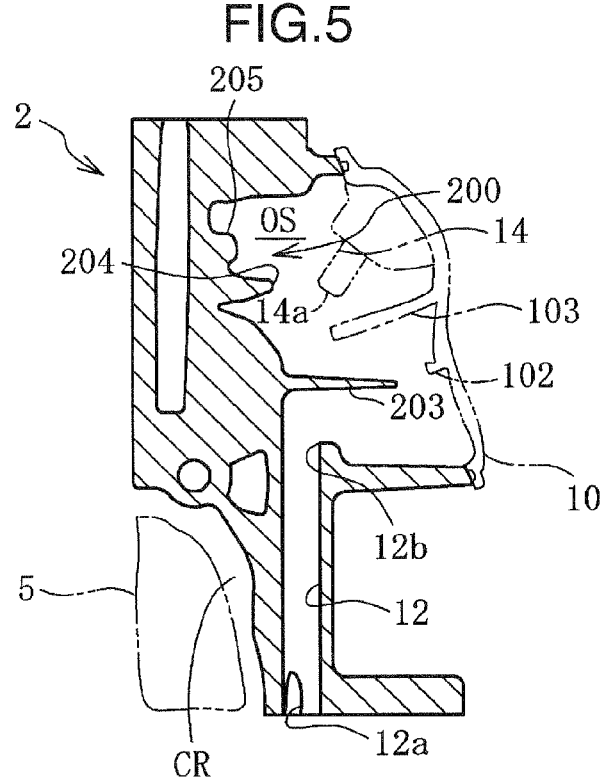
FIG. 5 is a sectional view taken along the line V-V in FIG. 2.
Figure 6:
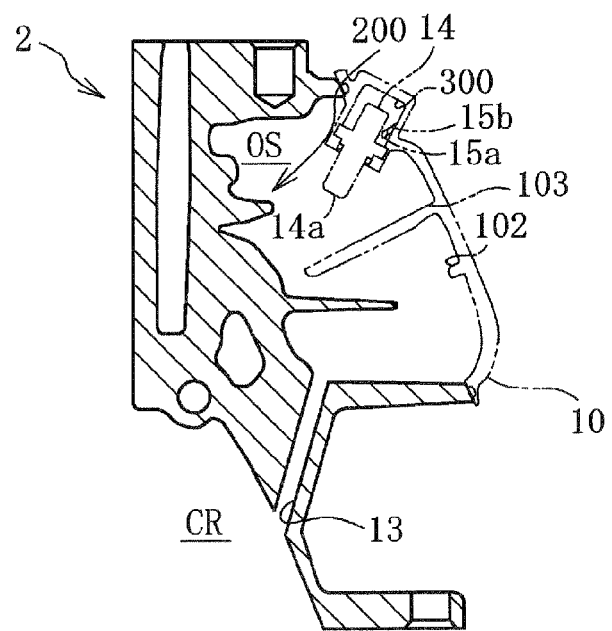
FIG. 6 is a sectional view taken along the line VI-VI in FIG. 2.

FIG. 2 is a side view showing the upper block 2, when viewed from the side of the intake unit IU. FIG. 3 is a bottom view showing the upper block 2, and FIG. 4 is a sectional view taken along the line IV-IV in FIG. 2. FIG. 5 is a sectional view taken along the line V-V in FIG. 2, and FIG. 6 is a sectional view taken along the line VI-VI in FIG. 2.

As shown in FIG. 2, a large number of reinforcing ribs, and an oil separation portion 200 for defining an oil separation space OS in cooperation with an oil separation cover 10, are formed on a surface of the upper block 2 on the side of the intake unit IU, i.e., on a surface of the front sidewall of the engine body ENG. The oil separation portion 200 is a concave portion formed in the sidewall of the upper block 2 on the side of the intake unit IU in a position corresponding to one cylinder bore. In FIG. 3, the four cylinders will hereinafter be referred to as "first cylinder", "second cylinder", "third cylinder" and "fourth cylinder", respectively, in order from the leftmost side.

The oil separation portion 200 has a cover mounting region 201 for allowing an attaching flange 101 of the oil separation cover 10 to be fastened thereto. The cover mounting region 201 is formed with six mounting-bolt holes 202a, 202b, 203c, 202d, 202e, 202f for allowing six fastening members, such as mounting bolts, to be engaged with corresponding cones thereof so as to fixedly fasten the attaching flange 101 of the oil separation cover 10 to the upper block 2, wherein three 202a, 202b, 203c of the mounting-bolt holes are arranged on a left side (in FIG. 2) of the cover mounting region 201, and the three remaining mounting-bolt holes 202d, 202e, 202f are arranged on a right side (in FIG. 2) of the cover mounting region 201. In a region of the oil separation portion 200 located inward of the cover mounting region 201, first, second and third baffle plates 203, 204, 205 are integrally formed on the surface of the front sidewall on the side of the intake unit IU in such a manner as to protrude frontwardly from the surface to cause oil contained in blow-by gas to attach thereon so as to separate the oil from the blow-by gas.

The lowermost first baffle plate 203 is formed at an approximately vertically intermediate position of the upper bock 2 to continuously extend rightwardly from the left zone of the cover mounting region 201 to a vicinity of the right zone of cover mounting region 201 (see FIG. 2). A distal edge of the first baffle plate 203 in a direction toward the intake unit IU is formed to extend up to a position beyond an intermediate position of the oil separation space OS in the longitudinal direction (see FIGS. 4 to 6).

The intermediate second baffle plate 204 is formed at an approximately indeterminate position between the first baffle plate 203 and an upper edge of the upper block 2 to continuously extend leftwardly from the right zone of the cover mounting region 201 to an approximately intermediate position of the oil separation space OS in the lateral direction (see FIG. 2). A length of the second baffle plate 204 in the direction toward the intake unit IU (i.e., in the longitudinal direction) is set to be about one-fourth that of the first baffle plate 203. A lower portion of the upper block 2 makes up an upper portion of a crank chamber CR, and a position corresponding to each cylinder bore is formed as a concave portion. Thus, a distal edge of the second baffle plate 204 is located at a position approximately corresponding to a base end of the first baffle plate 203 (see FIGS. 5 and 6).

The uppermost third baffle plate 205 is formed at an approximately indeterminate position between the second baffle plate 204 and the upper edge of the upper block 2 to extend from the right zone of the cover mounting region 201 to an approximately intermediate position of the second baffle plate 204 in a lengthwise direction of the engine body ENG (see FIG. 2). A length of the third baffle plate 205 in the direction toward the intake unit IU is set to be about one-half that of the second baffle plate 204 (see FIGS. 5 and 6).

In a vicinity of the bulkhead 5 between the third and fourth cylinders inside the upper block 2, a first gas passage 11 and a second gas passage 12 are formed on respective one of both sides of this bulkhead 5 and the corresponding crankshaft bearing to provide communication between the crank chamber CR and the oil separation space OS. In the engine in this embodiment, an order of ignition timing is set as follows: the first cylinder→the third cylinder→the fourth cylinder→the second cylinder, and a phase difference between respective combustion strokes in the third and fourth cylinders is 180 degrees (crank angle).

As shown in FIG. 3, first and second cutouts 11a, 12a are formed at respective lower ends of the first and second gas passages 11, 12, and blow-by gas in the crank chamber CR is introduced from the first and second cutouts 11a, 12a.

Each of the first and second gas passages 11, 12 has an upper open end (11b, 12b) opened in a base portion of the baffle plate 203 in such a manner as to be oriented upwardly to face a lower surface of the first baffle plate 203 (see FIGS. 4 and 5).

A portion of the sidewall defining a bottom of the oil separation space OS is formed to gradually inclined downwardly in the lengthwise direction of the engine, and an upper open end 13b of an oil return passage 13 is formed in the sidewall portion at a position close to an end of the engine body ENG in the lengthwise direction, i.e., at a height position lower than those of the upper open ends 11b, 12b of the first and second gas passages 11, 12.

As indicated by two-dot chain lines in FIGS. 4 to 6, the oil separation cover 10 covers the oil separation portion 200 formed on the surface of the upper block 2 on the side of the intake unit IU to define the oil separation space OS in cooperation with the oil separation portion 200. The oil separation cover 10 is formed with a first rib 102 extending toward the distal end of the first baffle plate 203, and a second rib 103 extending up to a vicinity of the base end of the first baffle plate 203.

A PCV valve 14 is attached to the oil separation cover 10 in such a manner that an upstream end thereof is exposed to the oil separation chamber OS, and the first and second baffle plates 203, 204 are interposed between an blow-by gas inlet opening 14a of the PCV valve 14 and each of the upper open ends 11b, 12b of the first and second gas passages 11, 12. The PCV valve 14 has a conventional structure where a spring is installed in a cylindrical-shaped housing, and a valve element is mounted to a distal end of the hosing in such a manner as to be opened against a biasing force of the spring by a negative pressure in the intake passage.

Further, a chamber 300 is integrally formed with the oil separation cover 10 to surround an upper end and an outer periphery of the PCV valve 14 on a downstream side. The chamber 300 and the surge tank 7 is communicated with each other via a third gas passage 15, and an upstream opening 15a of the third gas passage 15 is formed at a position on a downward side relative to the downstream end of the PCV valve 14 and at an intermediate position of a vertically lower region of the chamber 300. The third gas passage 15 is made up of an upstream gas passage region 15b formed in the oil separation cover 10 and a downstream gas passage region 15c formed in the surge tank 7.

Figure 7A:
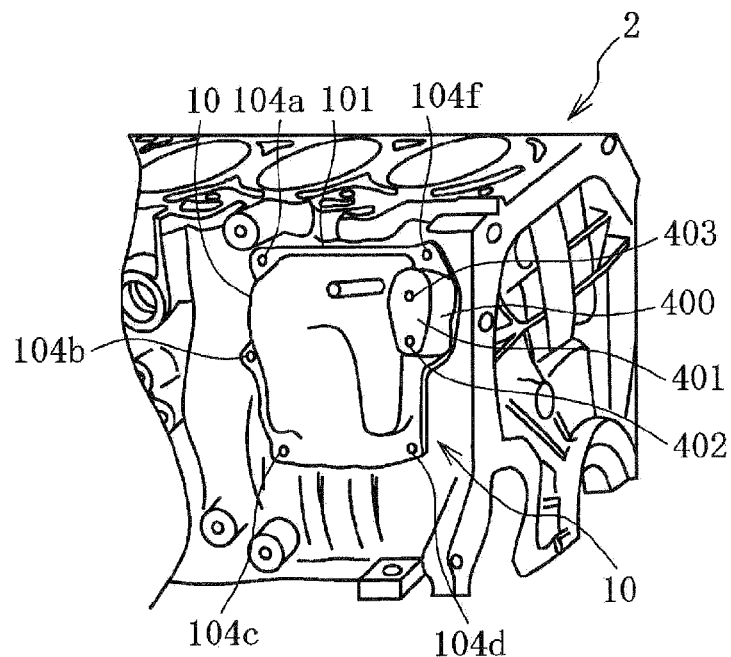
FIG. 7A is a perspective view of the engine body in a state after an oil separation cover is attached to a sidewall of the upper block on the side of the intake unit.
Figure 7B:
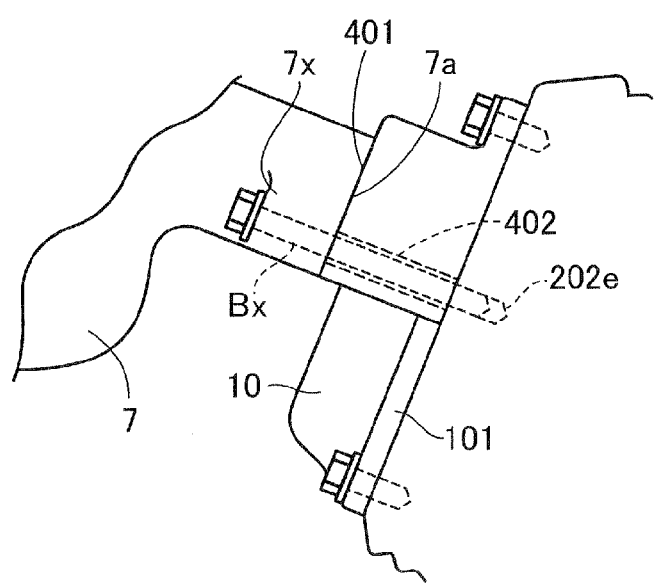
FIG. 7B is an explanatory diagram showing a state after a surge tank is attached to the engine body through the oil separation cover.
Figure 8:
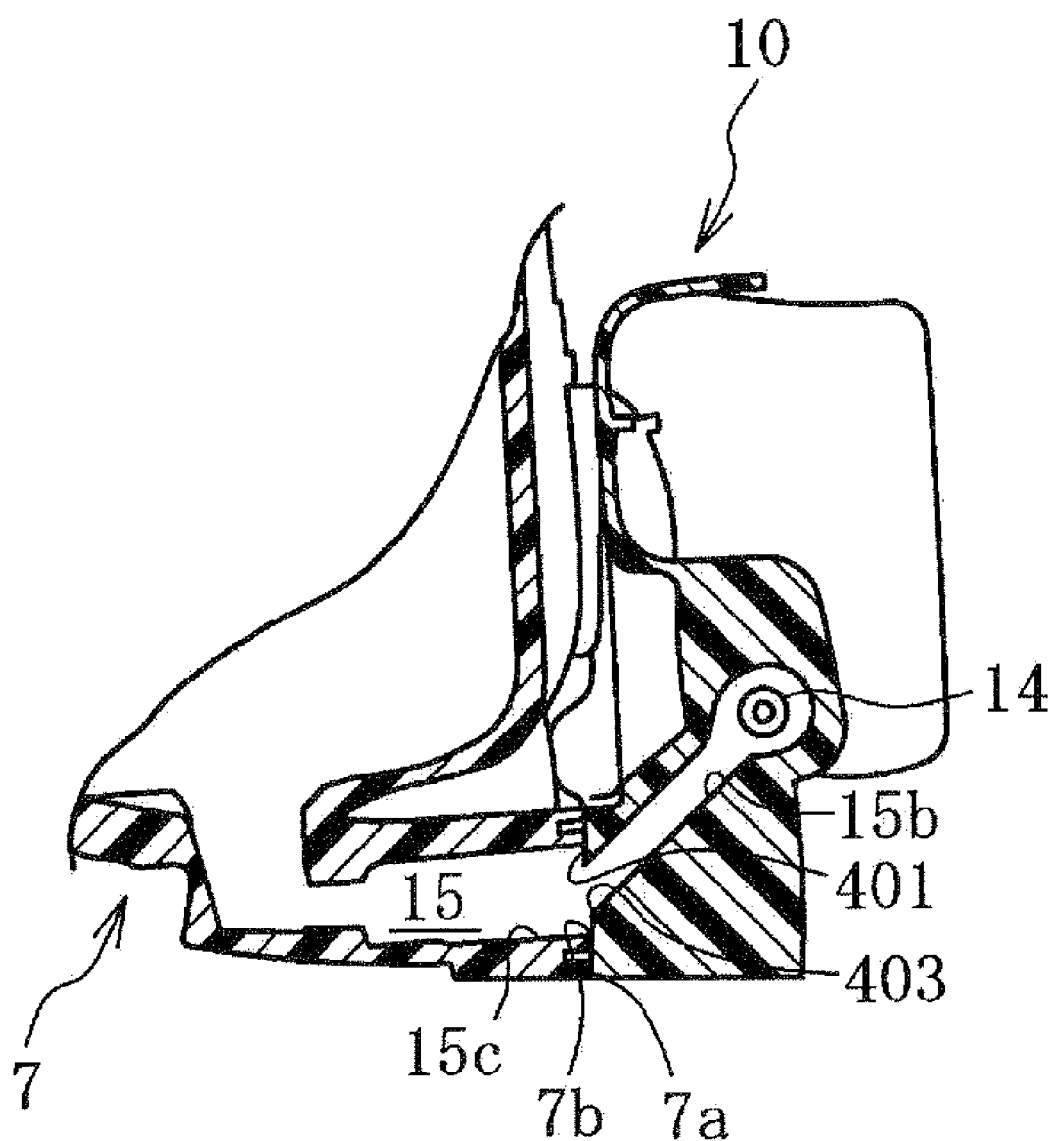
FIG. 8 is a fragmentary sectional view showing a connection portion between the oil separation cover and the surge tank in communication with each other.

With reference to FIGS. 7A to 8, a connection structure between the oil separation cover 10 and the surge tank 7 will be described below.

FIG. 7A is a perspective view of the engine body ENG in a state after the oil separation cover 10 is attached to the sidewall of the upper block 2 on the side of the intake unit 1U, and FIG. 7B is an explanatory diagram showing a state after the surge tank 7 is attached to the upper block 2 through the oil separation cover 10. FIG. 8 is a fragmentary sectional view showing a connection portion between the oil separation cover 10 and the surge tank 7 in communication with each other.

The oil separation cover 10 has a rim wall formed as an attaching flange 101. The oil separation cover 10 is fastened to the upper block 2 by fastening members, such as mounting bolts, while aligning five through-holes 104a, 104b, 104c, 104d, 104f formed in the attaching flange 101 with corresponding ones to the mounting-bolt holes 202a, 202b, 202c, 202d, 202f of the upper block 2.

The oil separation cover 10 has a surge-tank mounting portion 400 integrally formed therewith on a right region of the attaching flange 101. The surge-tank mounting portion 400 is formed in a columnar shape having a can-shaped cross-section and a height approximately equal to that of the oil separation space OS. The surge-tank mounting portion 400 has a flat upper surface serving as a mounting seat surface 401 capable of coming into surface contact with an attaching seat surface 7a of the surge tank 7.

As shown in FIG. 7B, the mounting seat surface 401 of the surge-tank mounting portion 400 is formed with a support through-hole 402 for allowing the surge tank 7 to be fastened to the oil separation cover 10 by a fastening member, such as a mounting bolt. The support through-hole 402 is formed to extend coaxially with a central one 202e of the three mounting-bolt holes formed in the right zone of the cover mounting region 201 of the upper block 2, so that one 7x of a plurality of fastening sites of the surge tank 7 and the oil separation cover 10 is co-fastened to the mounting-bolt hole 202e of the upper block 2, i.e., fastened together using a common fastening member, such as a common bolt Bx.

The upstream gas passage region 15b from the chamber 300 has a first opening 403 opened in a vicinity an opening of the support through-hole 402 on the mounting seat surface 401. The downstream gas passage region 15c formed in the surge tank 7 has a second opening (i.e., upstream open end) 7b opened on the attaching seat surface 7a. The first opening 403 and the second opening 7b are communicated with each other to form the third gas passage 15 for supplying blow-by gas to the surge tank 7 therethrough.

With reference to FIGS. 9 to 13, the structure of the oil separation cover 10 in this embodiment will be more specifically described below.

Figure 9:
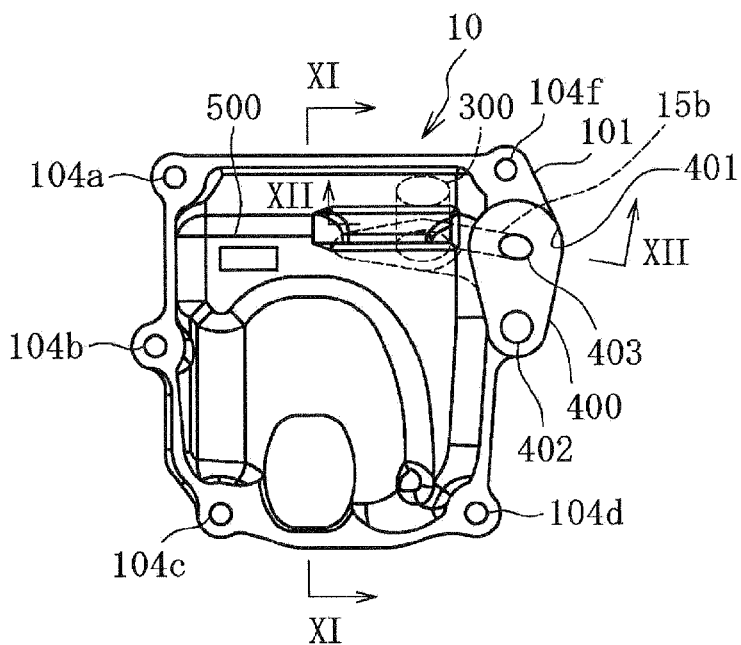
FIG. 9 is a front view showing the oil separation cover.
Figure 10:
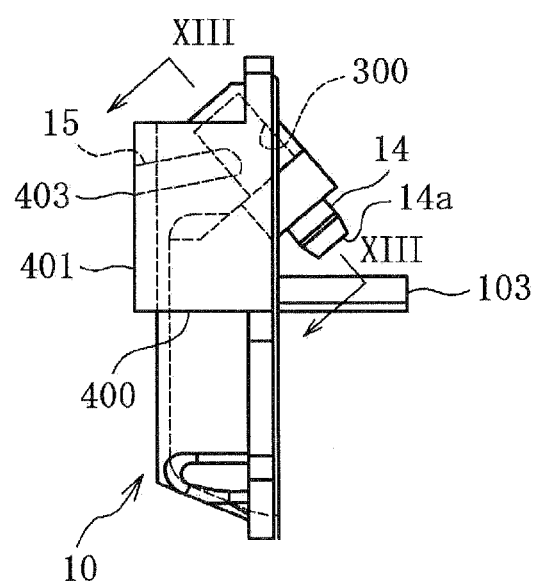
FIG. 10 is a side view showing the oil separation cover.
Figure 11:
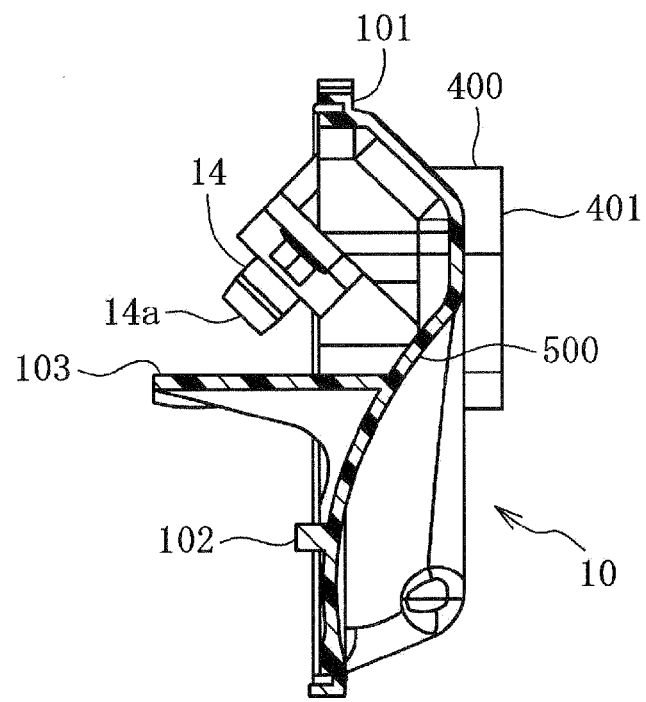
FIG. 11 is a sectional view taken along the line XI-XI in FIG. 9.
Figure 12:
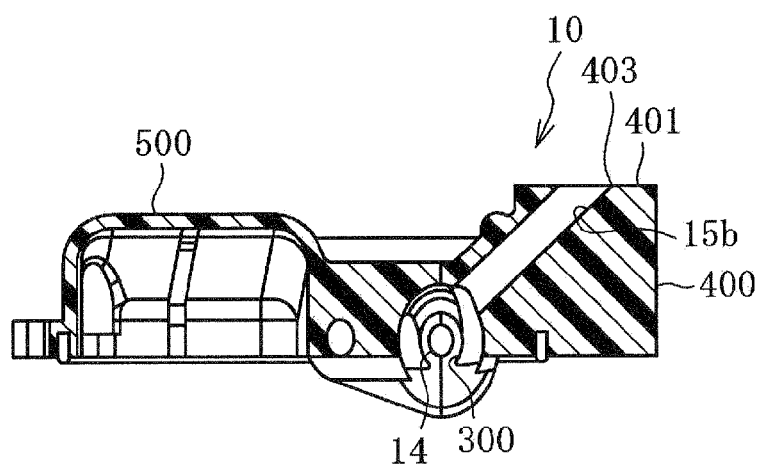
FIG. 12 is a sectional view taken along the line XII-XII in FIG. 9.
Figure 13:
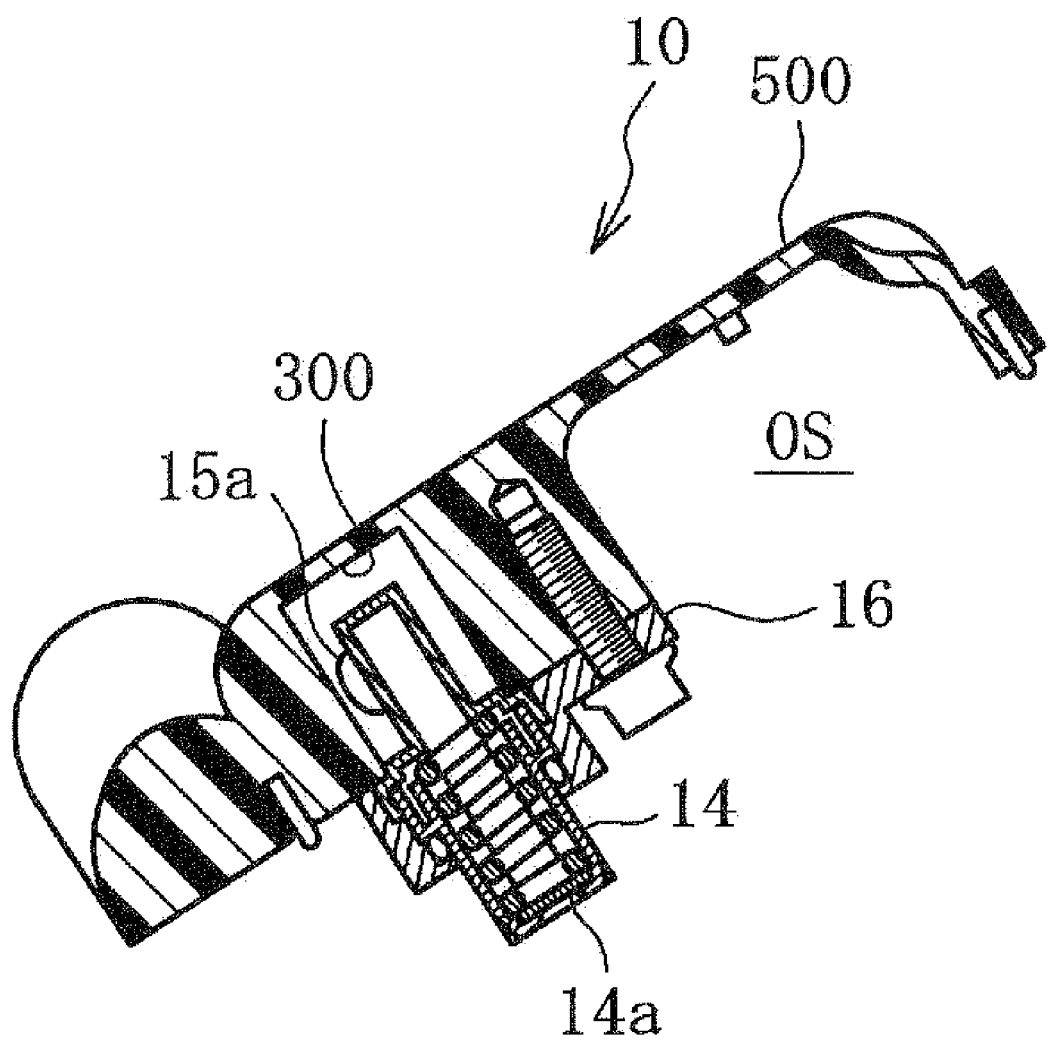
FIG. 13 is a sectional view taken along the line XIII-XIII in FIG. 10.

FIG. 9 is a front view showing the oil separation cover 10, and FIG. 10 is a side view showing the oil separation cover 10. FIG. 11 is a sectional view taken along the line XI-XI in FIG. 9, and FIG. 12 is a sectional view taken along the line XII-XII in FIG. 9. FIG. 13 is a sectional view taken along the line XIII-XIII in FIG. 10.

As shown in FIG. 9, the oil separation cover 10 has a raised portion 500, the attaching flange 101, the surge-tank mounting portion 400, and the chamber 300, all of which are made of a synthetic resin material and formed in a single piece.

In the oil separation cover 10, the raised portion 500 is form to raise an upper region, and a right region having the chamber 300, toward the intake unit IU, so as to define the oil separation space OS in cooperation with the oil separation portion 200. The second rib 103 is formed below the raised portion 500 and at an intermediate position of the oil separation cover 10, and the first rib 102 is formed below the second rib 103.

A rim wall of the oil separation cover 10 is formed as the attaching flange 101, and the five through-holes 104a, 104b, 104c, 104d, 104f for use in fastening are formed, respectively, at right upper, right lower, left upper and left lower corners and an approximately intermediate position of the left zone of the attaching flange 101, at positions corresponding to the mounting-bolt holes 202a, 202b, 202c, 202d, 202f formed in the upper block 2.

The surge-tank mounting portion 400 is formed in a columnar shape having a cam-shaped cross-section to extend from the right zone of the attaching flange 101 toward the intake unit 1U in parallel with the raised portion 500. The upper end surface of the serge-tank mounting portion 400 is formed as the flat mounting seat surface 401 facing the intake unit 1U. The support through-hole 402 formed in the surge-tank mounting portion 400 the to extend in coaxial relation with the mounting-bolt hole 202e formed in the upper block 2 is opened on the mounting seat surface 401.

The first opening 403 is opened at a position approximately intermediate between respective openings of the support through-hole 402 and the upper left through-hole 104f, and where it faces and comes into communication with the second opening 7b of the surge tank 7. The first opening 403 serves as a downstream end of the upstream gas passage region 15b of the third gas passage for supplying blow-by gas from the chamber 300.

The PCV valve 14 is attached inside a wall of the raised portion 500 at a position adjacent to the upper right through-hole 104f, and the chamber 300 is formed downstream of the PCV valve 14. As shown in FIGS. 10 and 11, the PCV valve 14 is positioned such that the inlet opening 14a thereof is oriented in opposed relation to the second rib 103 to prevent blow-by gas supplied from the crank chamber CR from being directly introduced into the PCV valve 14.

As shown in FIG. 13, a valve support member 16 is fixedly fastened from a back surface of the oil separation cover 10 to allow a downstream portion of the PCV valve 14 to be received in the chamber 300.

As shown in FIG. 12, the upstream gas passage region 15b of the oil separation cover 10 extends from the chamber 300 to the first opening 403 opened on the mounting seat surface 401, through a main wall (other than the rim wall but including the surge-tank mounting portion) of the oil separation cover 10. In a state after the engine is mounted on a vehicle, the upstream opening 15a of the upstream gas passage region 15b opened to the chamber 300 is located at a position on a downward side relative to the downstream end of the PCV valve 14 and at an intermediate position of a vertically lower region of the chamber 300.

A function and advantage of the blow-by gas recirculation system according to this embodiment will be described below.

When the engine is operated in idling conditions or in low load conditions, a negative pressure is generated in a region of the intake passage downstream of the throttle valve, and the PCV valve is opened against the biasing force of the spring, so that a gas passage between the crank chamber CR and the region of the intake passage downstream of the throttle valve, specifically the gas passage between the crank chamber CR and the surge tank, and blow-by gas in the crank chamber CR is sucked according to the negative intake pressure.

The blow-by gas is supplied from the first and second cutouts 11a, 12a formed in the matching surfaces of the upper block 2 and the lower block 3 and communicated with crank sub-chambers of the third and fourth cylinders, to the oil separation space OS through the first and second gas passages 11, 12.

In cases where the lattice structure utilizing the bulkhead 5 in the upper block 2 and the crankshaft bearing in the lower block 3 is employed to prevent vibration of the engine body as in this embodiment, a communication area between respective crank sub-chambers of the cylinders is small, and thereby a change in pressure of the crank sub-chamber in each of the cylinders is significantly increased. Thus, in order to minimize intervals of pressure pulsation, the gas passages are communicated with the crank sub-chambers of the third and fourth cylinders having a combustion phase difference of 180 degrees, on respective one of both sides of the bulkhead therebetween. This makes it possible to further suppress fluctuation in pressure to be transmitted to the oil separation space.

The blow-by gas introduced from the upper open ends 11b, 12b of the first and second gas passages into the oil separation space OS collides with the first baffle plate 203 disposed in opposed relation to the upper open ends 11b, 12b, and moves toward the PCV valve 14 while allowing an oil mist contained in the blow-by gas to attach on the baffle plates. The first, second and third baffle plates 203, 204, 205 and the first and second ribs 102, 103 are alternately disposed in a labyrinthine arrangement in a pathway between the upper open ends 11*b*, 12*b* and the inlet opening 14*a* of the PCV valve 7. This arrangement makes it possible to sufficiently increase a distance of the pathway between upper open ends 11*b*, 12*b* and the inlet opening 14*a* of the PCV valve 7 to minimize pressure fluctuation acting on the inlet opening 14*a* and improve a capability to separate oil from blow-by gas.

The oil attached on the baffle plates and the ribs flows down to a bottom of the oil separation portion 200 through the surface of the sidewall of the upper block 2 and the inner wall surface of the oil separation cover 10. Then, the oil is returned to the crank chamber CR from the opening 13*b* of the oil return passage opened at the lowermost position.

The blow-by gas passing through the PCV valve 14 is released into the chamber formed in the oil separation cover 10, and introduced from the upstream opening 15*a* opened to the chamber 300, into the third gas passage 15.

The upstream opening 15*a* opened to the chamber 300 is set at the position on the downward side relative to the downstream end of the PCV valve 14 in the state after the engine is mounted on a vehicle. This makes it possible to prevent blow-by gas from attaching on the downstream end of the PCV valve 14 even if blow-by gas flows back from the third gas passage 15 due to freeze of moisture contained in the blow-by gas.

Further, The upstream opening 15*a* is set at the intermediate position of the vertically lower region of the chamber 300, so that the housing of the PCV valve 14 can be utilized as a dam to accumulate condensed water in the chamber 300, and prevent the downstream end of the PCV valve 14 or the upstream opening 15*a* opened to the chamber 300 from being blocked by frozen water.

The upstream gas passage region 15*b* of the third gas passage 15 extends up to the mounting seat surface 401 of the surge-tank mounting portion 400 through the main wall of the oil separation cover 10, and the first opening 403 of the oil separation cover 10 is communicated with the second opening 7*b* as the upstream open end of the downstream gas passage region 15*c* of the surge tank 7, at a position adjacent to a mounting portion of the surge tank 7 to the oil separation cover 10. That is, the third gas passage 15 is formed by utilizing the mounting portion of the surge tank 7 to the oil separation cover 10, and blow-by gas is recirculated to the surge tank 7 via the third passage 15. This makes it possible to eliminate the need for an additional connection member, such as a PCV hose, to prevent deterioration in blow-by gas recirculation capability due to defective assembling of a PCV hose during a production process.

The blow-by gas recirculation system according to this embodiment can lay out the oil separation space OS, the PCV valve 14 and the third gas passage at a position behind the intake unit IU to prevent occurrence of icing.

Further, in the blow-by gas recirculation system according to this embodiment, even when the intake manifold 8 is made of a synthetic resin material, mountability for a heavy component, such as an electronically controlled throttle body, can be reliably maintained.

Although the above embodiment has been described based on one example where the present invention is applied to a transverse-mounted 4-cylinder engine, the type of target engine of the present invention is not limited thereto in view of the scheme and features of the present invention.

The present invention may be summarized as follows.

The present invention provides a blow-by gas recirculation system for an internal combustion engine to separate oil from blow-by gas introduced from an inside of an engine body into an oil separation space and then supply the blow-by gas to a region of an intake passage downstream of a throttle valve in an intake system. The blow-by gas recirculation system comprises an intake unit provided with the throttle valve and the intake passage and disposed on the side of one of opposite sidewalls of the engine body, an oil separation cover attached to the one sidewall of the engine body to define the oil separation space in cooperation with the one sidewall, and a gas passage which provides communication between the oil separation space and the region of the intake passage downstream of the throttle valve of the intake unit, wherein the gas passage is formed inside the oil separation cover and the intake unit. The oil separation cover has a rim wall formed as an attaching flange, wherein the oil separation cover is fastened to the engine body at a plurality of positions through the attaching flange, and the attaching flange is formed to have a mounting seat surface for the intake unit. The intake unit has a contact surface formed on a gas passage-adjacent portion thereof located adjacent to a region of the gas passage formed thereinside, wherein the intake unit is fastened to the oil separation cover under a condition that the contact surface is in contact with the mounting seat surface of the oil separation cover. The gas passage is formed to penetrate through the contact surface.

In the blow-by gas recirculation system of the present invention, the gas passage for providing communication between the oil separation space and the region of the intake passage downstream of the throttle valve can be formed by the oil separation cover and the intake unit, so that the need for a PCV hose can be eliminated. This makes it possible to eliminate a PCV hose which has been required for conventional structures, to prevent deterioration in blow-by gas recirculation capability due to defective assembling of a PCV hose.

In the blow-by gas recirculation system of the present invention, the mounting seat surface for the intake unit is formed on the oil separation cover. Thus, through an operation of fastening the intake unit to the oil separation cover, the gas passage can be formed in such a manner as to penetrate through the oil separation cover and the intake unit while improving the mounting strength of the intake unit. This makes it possible to ensure a space for arrangement of a gas passage while improving the mounting strength of the intake unit.

Further, the mounting portion of the surge tank to the oil separation cover can be arranged in a vicinity of the attaching flange for fastening the oil separation cover to the engine body. This makes it possible to effectively distribute a weight of the intake unit to the fastening portion between the attaching flange of the oil separation cover and the engine body to improve the mounting strength of the intake unit.

Preferably, the blow-by gas recirculation system of the present invention further comprises a positive crankcase ventilation (PCV) valve provided in the oil separation cover to introduce therethrough blow-by gas into a region of the gas passage communicated with the oil separation space, wherein the mounting seat surface is formed on a columnar-shaped portion which protrudes from the attaching flange to have a thickness greater than that of the attaching flange, and wherein the columnar-shaped portion is formed with a region of the gas passage which provides communication between the PCV valve and the mounting seat surface, and has one end opened on the mounting seat surface.

Preferably, in the blow-by gas recirculation system of the present invention, the oil separation cover is made of a resin material. In this case, a reduction in weight can be facilitated.

Preferably, in the blow-by gas recirculation system of the present invention, the gas passage-adjacent portion of the intake unit is fastened to the engine body while interposing the oil separation cover therebetween.

Further, at least one fastening site of the gas passage-adjacent portion among a plurality of fastening sites for attaching the intake unit to the oil separation cover (to eventually the engine body) may be used as one of a plurality of fastening sites for attaching the oil separation cover to the engine body, in a shared manner. More specifically, the oil separation cover may be formed with a support through-hole to extend from the mounting support surface in a thickness direction of the main wall, wherein the support through-hole is in coaxial relation with the at least one fastening site of the gas passage-adjacent portion (the second opening-adjacent portion) among the plurality of fastening sites for attaching the intake unit to the oil separation cover (eventually to the engine body).

According to these features, the intake unit and the oil separation cover can be fastened to the engine body by a common fastening member, such as a common mounting bolt. This makes it possible to simplify a fastening operation and further improve the mounting strength.

The present invention further provides a blow-by gas recirculation system for an internal combustion engine to separate oil from blow-by gas introduced from an inside of an engine body into an oil separation space and then supply the blow-by gas to a region of an intake passage downstream of a throttle valve in an intake system. The blow-by gas recirculation system comprises an intake unit provided with the throttle valve and the intake passage and disposed on the side of one of opposite sidewalls of the engine body, an oil separation cover attached to the one sidewall of the engine body to define the oil separation space in cooperation with the one sidewall, a positive crankcase ventilation (PCV) valve provided in the oil separation cover and in communication with the oil separation space, and a gas passage which provides communication between the oil separation space and a region of the intake passage downstream of the throttle valve of the intake unit. The gas passage is formed inside the oil separation cover and the intake unit. The oil separation cover has a rim wall formed as an attaching flange, and a main wall formed with an upstream region of the gas passage which has an downstream end opened as a first opening on the mounting seat surface, wherein the oil separation cover is fastened to the engine body at a plurality of positions through the attaching flange, and the attaching flange is formed to have a mounting seat surface for the intake unit. The intake unit is formed with an downstream region of the gas passage which has an upstream end opened as a second opening facing the first opening of the oil separation cover, wherein the intake unit is fastened to the oil separation cover under a condition that a second opening-adjacent portion thereof located adjacent to the second opening of the intake unit is in contact with the mounting seat surface of the oil separation cover.

In the above blow-by gas recirculation system of the present invention, the first and second openings for communicating the upstream and downstream gas passage regions are formed in a contact portion between the intake unit and the oil separation cover, so that the need for a PCV hose can be eliminated. In addition, the support of the intake unit relative to the engine body and the mounting of the intake unit to the oil separation cover can be simultaneously achieved by utilizing the contact portion. This makes it possible to eliminate a PCV hose which has been required for conventional structures, to prevent deterioration in blow-by gas recirculation capability due to defective assembling of a PCV hose. Further, the structure capable of simultaneously achieving the support of the intake unit relative to the engine body and the mounting of the intake unit to the oil separation cover by utilizing the contact portion makes it possible to ensure a space for arrangement of a gas passage while improving the mounting strength of the intake unit.

This application is based on Japanese Patent Application Serial No. 2008-054644 filed in Japan Patent Office on Mar. 5, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A blow-by gas recirculation system for an internal combustion engine to separate oil from blow-by gas introduced from an inside of an engine body into an oil separation space and then supply the blow-by gas to a region of an intake passage downstream of a throttle valve in an intake system, comprising:
   an intake unit provided with the throttle valve and the intake passage and disposed on the side of one of opposite sidewalls of the engine body;
   an oil separation cover attached to the one sidewall of the engine body to define the oil separation space in cooperation with the one sidewall; and
   a gas passage which provides communication between the oil separation space and the region of the intake passage downstream of the throttle valve of the intake unit, the gas passage being formed inside the oil separation cover and the intake unit,
   wherein
   the oil separation cover has a rim wall formed as an attaching flange and an intake unit mounting portion,
   the oil separation cover being fastened to the engine body at a plurality of positions through the attaching flange,
   the intake unit mounting portion is integrally formed with a region of the attaching flange, said intake unit mounting portion has a mounting seat surface for mounting the intake unit; and
   the intake unit has a contact surface formed on a gas passage-adjacent portion thereof located adjacent to a region of the gas passage formed thereinside, the intake unit being fastened to the oil separation cover under a condition that the contact surface is in contact with the mounting seat surface of the oil separation cover; and
   the gas passage is formed to penetrate through the contact surface.

2. The blow-by gas recirculation system according to claim 1, further comprising a positive crankcase ventilation (PCV) valve provided in the oil separation cover to allow communication of blow-by gas out of the oil separation space through said gas passage,
   wherein said intake unit mounting portion in the form of on a columnar-shaped portion which protrudes from the attaching flange to have a thickness greater than that of the attaching flange, the columnar-shaped portion being formed with a region of the gas passage which provides communication between the PCV valve and the mounting seat surface, and has one end opened on the mounting seat surface.

3. The blow-by gas recirculation system according to claim 1, wherein the oil separation cover is made of a resin material.

4. The blow-by gas recirculation system according to claim 1, wherein the gas passage-adjacent portion of the intake unit is fastened to the engine body while interposing the oil separation cover therebetween.

5. The blow-by gas recirculation system according to claim 4, wherein at least one fastening site of the gas passage-adjacent portion among a plurality of fastening sites for attaching the intake unit to the oil separation cover is used as one of a plurality of fastening sites for attaching the oil separation cover to the engine body, in a shared manner.

6. A blow-by gas recirculation system for an internal combustion engine to separate oil from blow-by gas introduced from an inside of an engine body into an oil separation space and then supply the blow-by gas to a region of an intake passage downstream of a throttle valve in an intake system, comprising:
 an intake unit provided with the throttle valve and the intake passage and disposed on the side of one of opposite sidewalls of the engine body;
 an oil separation cover attached to the one sidewall of the engine body to define the oil separation space in cooperation with the one sidewall;
 a positive crankcase ventilation (PCV) valve provided in the oil separation cover and in communication with the oil separation space; and
 a gas passage which provides communication between the oil separation space and a region of the intake passage downstream of the throttle valve of the intake unit, the gas passage being formed inside the oil separation cover and the intake unit,
 wherein
 the oil separation cover has a rim wall formed as an attaching flange and an intake unit mounting portion,
 the intake unit mounting portion is integrally formed with a region of the attaching flange, said intake unit mounting portion has a mounting seat surface for mounting the intake unit, and
 a main wall formed with an upstream region of the gas passage which has an downstream end opened as a first opening on the mounting seat surface, the oil separation cover being fastened to the engine body at a plurality of positions through the attaching flange, the attaching flange being formed to have a mounting seat surface for the intake unit; and
 the intake unit is formed with a downstream region of the gas passage which has an upstream end opened as a second opening facing the first opening of the oil separation cover, the intake unit being fastened to the oil separation cover under a condition that a second opening-adjacent portion thereof located adjacent to the second opening of the intake unit is in contact with the mounting seat surface of the oil separation cover.

7. The blow-by gas recirculation system according to claim 6, wherein the oil separation cover is made of a resin material.

8. The blow-by gas recirculation system according to claim 6, wherein the gas passage-adjacent portion of the intake unit is fastened to the engine body while interposing the oil separation cover therebetween.

9. The blow-by gas recirculation system according to claim 6, wherein at least one fastening site of the gas passage-adjacent portion among a plurality of fastening sites for attaching the intake unit to the oil separation cover is used as one of a plurality of fastening sites for attaching the oil separation cover to the engine body, in a shared manner.

10. The blow-by gas recirculation system according to claim 9, wherein the oil separation cover is formed with a support through-hole to extend from the mounting support surface in a thickness direction of the main wall, wherein the support through-hole is in coaxial relation with the at least one fastening site of the gas passage-adjacent portion among the plurality of fastening sites for attaching the intake unit to the oil separation cover.

11. A blow-by gas recirculation system for an internal combustion engine to separate oil from blow-by gas introduced from an inside of an engine body into an oil separation space and then supply the blow-by gas to a region of an intake passage downstream of a throttle valve in an intake system, comprising:
 an intake unit provided with the throttle valve and the intake passage and disposed on the side of one of opposite sidewalls of the engine body;
 an oil separation cover attached to the one sidewall of the engine body to define the oil separation space in cooperation with the one sidewall; and
 a gas passage which provides communication between the oil separation space and the region of the intake passage downstream of the throttle valve of the intake unit, the gas passage being formed inside the oil separation cover and the intake unit,
 wherein
 the oil separation cover has a rim wall formed as an attaching flange, the oil separation cover being fastened to the engine body at a plurality of positions through the attaching flange, the attaching flange being formed to have a mounting seat surface for the intake unit; and
 the intake unit has a contact surface formed on a gas passage-adjacent portion thereof located adjacent to a region of the gas passage formed thereinside, the intake unit being fastened to the oil separation cover under a condition that the contact surface is in contact with the mounting seat surface of the oil separation cover; and
 the gas passage is formed to penetrate through the contact surface,
 wherein the gas passage-adjacent portion of the intake unit is fastened to the engine body while interposing the oil separation cover therebetween, and
 wherein at least one fastening site of the gas passage-adjacent portion among a plurality of fastening sites for attaching the intake unit to the oil separation cover is used as one of a plurality of fastening sites for attaching the oil separation cover to the engine body, in a shared manner.

12. A blow-by gas recirculation system for an internal combustion engine to separate oil from blow-by gas introduced from an inside of an engine body into an oil separation space and then supply the blow-by gas to a region of an intake passage downstream of a throttle valve in an intake system, comprising:
 an intake unit provided with the throttle valve and the intake passage and disposed on the side of one of opposite sidewalls of the engine body;
 an oil separation cover attached to the one sidewall of the engine body to define the oil separation space in cooperation with the one sidewall;
 a positive crankcase ventilation (PCV) valve provided in the oil separation cover and in communication with the oil separation space; and
 a gas passage which provides communication between the oil separation space and a region of the intake passage downstream of the throttle valve of the intake unit, the gas passage being formed inside the oil separation cover and the intake unit,
 wherein the oil separation cover has a rim wall formed as an attaching flange, and a main wall formed with an upstream region of the gas passage which has an downstream end opened as a first opening on the mounting seat surface, the oil separation cover being fastened to the engine body at a plurality of positions through the attaching flange, the attaching flange being formed to have a mounting seat surface for the intake unit, the intake unit is formed with an downstream region of the gas passage which has an upstream end opened as a second opening facing the first opening of the oil separation cover, the intake unit being fastened to the oil separation cover under a condition that a second opening-adjacent portion thereof located adjacent to the second opening of the intake unit is in contact with the mounting seat surface of the oil separation cover, and wherein at least one fastening site of the gas passage-adjacent portion among a plurality of fastening sites for attaching the intake unit to the oil separation cover is used as one of a plurality of fastening sites for attaching the oil separation cover to the engine body, in a shared manner.

* * * * *